US007009998B2

(12) United States Patent
Leuca et al.

(10) Patent No.: US 7,009,998 B2
(45) Date of Patent: *Mar. 7, 2006

(54) SHORT MESSAGING METHOD AND SYSTEM FOR AIRBORNE PASSENGERS

(75) Inventors: Ioan Leuca, Bellevue, WA (US); Wen-Ping Ying, Bellevue, WA (US)

(73) Assignee: Cingular Wireless II, LLC, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/211,929

(22) Filed: Aug. 2, 2002

(65) Prior Publication Data

US 2003/0043811 A1   Mar. 6, 2003

Related U.S. Application Data

(63) Continuation of application No. 09/520,806, filed on Mar. 8, 2000, now Pat. No. 6,449,287, which is a continuation of application No. 08/989,623, filed on Dec. 12, 1997, now abandoned.

(51) Int. Cl.
*H04J 3/16* (2006.01)
(52) U.S. Cl. .................. 370/468; 370/477; 370/316
(58) Field of Classification Search ............. 370/312, 370/315, 316, 319, 321, 322, 323, 428, 429, 370/465, 468, 477; 379/112.01, 133, 88.22, 379/88.23, 2; 455/423, 431
See application file for complete search history.

(56) References Cited

U.S. PATENT DOCUMENTS 4,730,348 A    3/1988  MacCrisken
4,903,298 A *  2/1990  Cline ..................... 380/270
5,063,588 A   11/1991  Patsiokas et al.
5,113,429 A    5/1992  Morley, Jr. et al.
5,278,891 A    1/1994  Bhagat et al.
5,408,515 A    4/1995  Bhagat et al.
5,438,610 A    8/1995  Bhagat et al.
5,463,620 A   10/1995  Sriram
5,539,452 A    7/1996  Bush et al.
5,563,879 A   10/1996  Sanders et al.
5,592,539 A    1/1997  Amarant et al.
5,651,050 A    7/1997  Bhagat et al.
5,673,256 A *  9/1997  Maine ..................... 370/271
5,712,907 A    1/1998  Wegner et al.
5,742,601 A    4/1998  Riedel
5,805,683 A *  9/1998  Berberich, Jr. ......... 379/142.03
5,898,768 A *  4/1999  Beyda et al. .......... 379/220.01
5,949,766 A *  9/1999  Ibanez-Meier et al. ..... 370/316
5,950,129 A *  9/1999  Schmid et al. ............. 455/431
6,097,961 A    8/2000  Alanara et al.

* cited by examiner

*Primary Examiner*—Bob A. Phunkulh
(74) *Attorney, Agent, or Firm*—Klarquist Sparkman, LLP

(57) ABSTRACT

An air-to-ground telecommunications system allows callers to store messages on an aircraft data server when sufficient air-to-ground communication bandwidth is unavailable for transmitting a call. The system allows aircraft callers to leave voice, fax, e-mail or other data messages. The messages are stored on the aircraft until sufficient bandwidth becomes available for transmission to the ground. Transmitting messages requires shorter air time and more efficient bandwidth usage because messages do not require a high degree of interaction between parties. The messages can also be compressed before transmission for further efficiently using aircraft-to-ground bandwidth.

39 Claims, 2 Drawing Sheets

SHORT MESSAGING METHOD AND SYSTEM FOR AIRBORNE PASSENGERS

CROSS-REFERENCE TO RELATED APPLICATIONS

This application is a continuation of application Ser. No. 09/520,806, filed Mar. 8, 2000, U.S. Pat. No. 6,449,287 which is a continuation of application Ser. No. 08/989,623, filed Dec. 12, 1997, now abandoned.

BACKGROUND OF THE INVENTION

1. Field of the Invention

The present invention relates to the field of telecommunications. More particularly, the present invention relates to a method and a system for communicating between parties, of which at least one party is an airborne party.

2. Description of Related Art

Conventional communications systems allow radio-frequency (RF) communications between an airborne party, for example, on an airplane, and a ground-based party. Due to the limited radio-frequency (RF) bandwidth available for an aircraft-to-ground link, only a small number of airborne callers can use such a system at any one time. When a particular aircraft-to-ground link is filled to capacity, calls from an aircraft are placed into a queue until a channel becomes available. This is inconvenient for some callers because the purpose of the call was to convey a short message to another party and by being placed in a queue causes the call to take much longer than should be necessary. What is needed is a system that allows an airborne caller to leave a message for a ground-based caller without waiting for an aircraft-to-ground channel to become available. What is also needed is a system that compresses messages, thereby efficiently using the aircraft-to-ground bandwidth.

SUMMARY OF THE INVENTION

The present invention provides a method and a communications system that allows airborne callers to leave voice, data, or fax messages for intended recipients who are ground-based. The messages are stored on an airborne platform until sufficient bandwidth becomes available for transmission to a ground-based station. Transmitting messages requires correspondingly shorter air time and results in an efficient bandwidth usage because messages do not require a high degree of interaction between parties. The present invention further provides a system that compresses a stored message before transmission so that aircraft-to-ground bandwidth is used efficiently.

The advantages of the present invention are provided by a method and a communications system that includes a plurality of aircraft telephone units, a control unit coupled to the aircraft telephone units, a memory device that stores messages when communication bandwidth is unavailable, and a transceiver that sends and receives calls and messages to and from ground stations. An airborne party is given the option of storing a message or waiting to place the call directly when sufficient bandwidth becomes available. A stored message can be compressed before transmission and decompressed after reception, making shorter broadcast times possible. The caller is given the option of having a message sent directly to an intended recipient, or to an answering service, and a delivery receipt is transmitted to the originator of the message. Messages can be a voice message, an e-mail message, a fax message, or a data message. The message can be divided into a plurality of packets that are each transmitted separately for further improving efficient bandwidth usage.

BRIEF DESCRIPTION OF THE DRAWINGS

The present invention is illustrated by way of example and not limitation in the accompanying figures in which like reference numerals indicate similar elements and in which.

DETAILED DESCRIPTION

Figure 1:
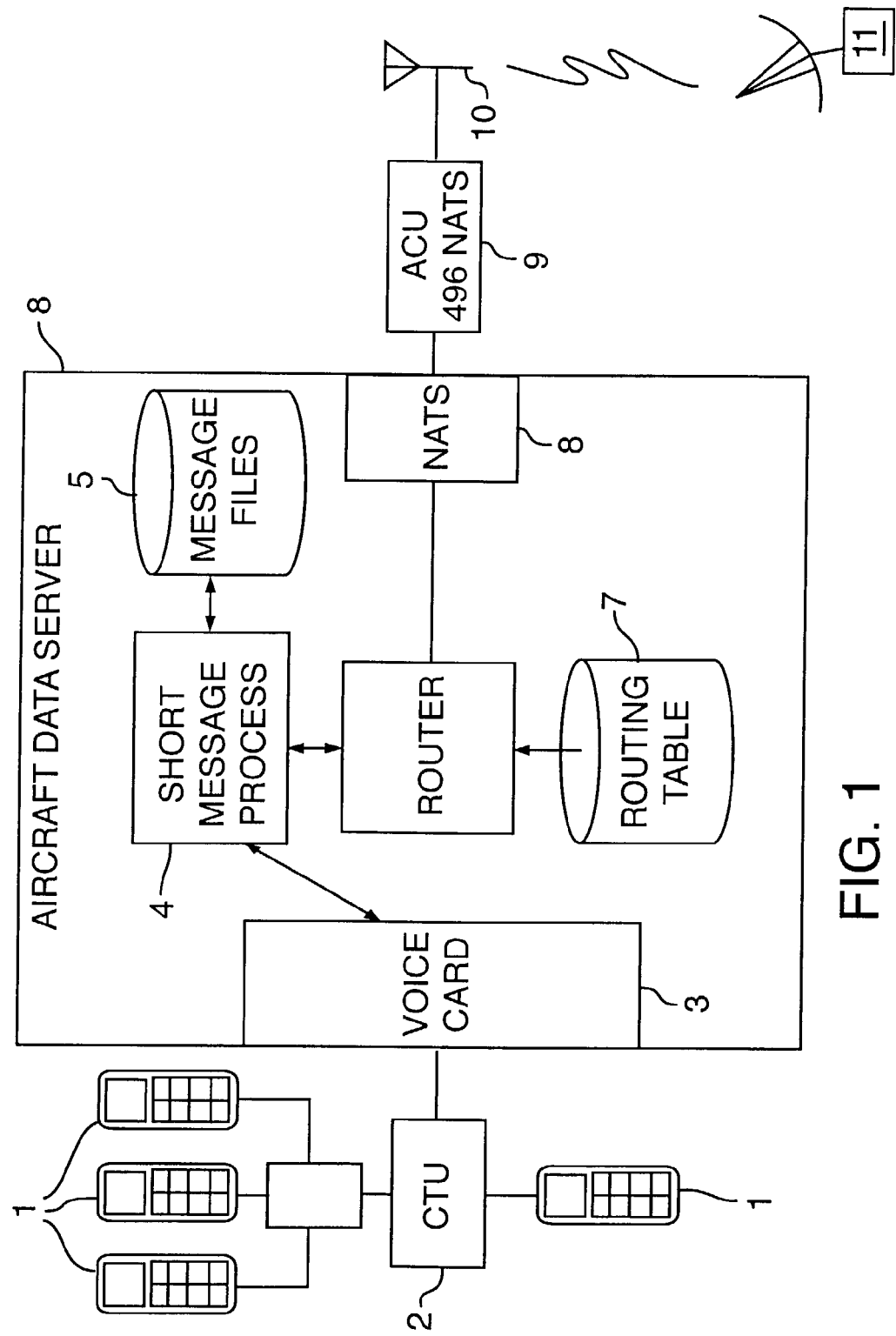
FIG. 1 illustrates an aircraft short messaging system according to the present invention.

FIG. 1 shows a schematic block diagram of an aircraft-to-ground telecommunications system that allows airborne callers to leave short messages for intended recipients who are ground-based according to the present invention. The present invention be used on airborne platforms such as airplanes, helicopters and space vehicles. Callers place and receive calls using aircraft telephone or terminal units 1. Calls can be voice, fax, e-mail or other data transmission. Outgoing calls are routed to a Cabin Telecommunications Unit (CTU) 2. CTU 2 prompts the caller in a well-known manner for obtaining call data, such as the message type, that is, whether the call is a voice call or a data call, the destination of the call and the method of payment. Once the call data has been collected and validated, CTU 2 then requests an idle air-to-ground channel from a Bearer Service System (BSS) 9. If there is sufficient air-to-ground bandwidth for the call, CTU 2 proceeds with the call.

If there is insufficient air-to-ground bandwidth for the call, CTU 2 routes the call to a voice processing circuit 3 that is part of an aircraft data server 13 for recording a short message. Voice processing circuit 3 interacts with a short message processor 4 for handling the message, such as by compressing and/or encrypting the message. Short message processor 4 prompts the caller to begin the message transfer. The message is recorded, compressed and/or encrypted and stored in a message file memory 5. Multiple messages are stored in a message data file.

Short message processor 4 receives availability status air-to-ground bandwidth via a Bearer Services System (BSS) interface (IF) circuit 8. When sufficient air-to-ground bandwidth becomes available, short message processor 4 instructs a router 6 to deliver message files stored in message files memory 5 to a ground station 11. Router 6 also performs call control functions and, if needed, multiplexing of short message file contents with data from other aircraft data server applications. Data transfer from aircraft data server 8 to the ground station 11 is accomplished via a Bearer Services System 9 and an antenna 10, employing wellknown air-to-ground communication system techniques, such as that used by AT&T's North American Terrestrial System (NATS). Ground station II forwards the short message file to a short message ground-based server 12 using well-known data communications techniques. Short message server 12 parses the received short message file into the different short messages forming the message file, decompresses and/or decrypts the respective messages and attempts to deliver each respective message to its intended destination 14. That is, voice messages are sent the destination voice terminals and data messages are sent to data terminals. Short message server 12 tracks delivery status of each respective message and provides status information to the message originator as requested by the message originator.

Figure 2:
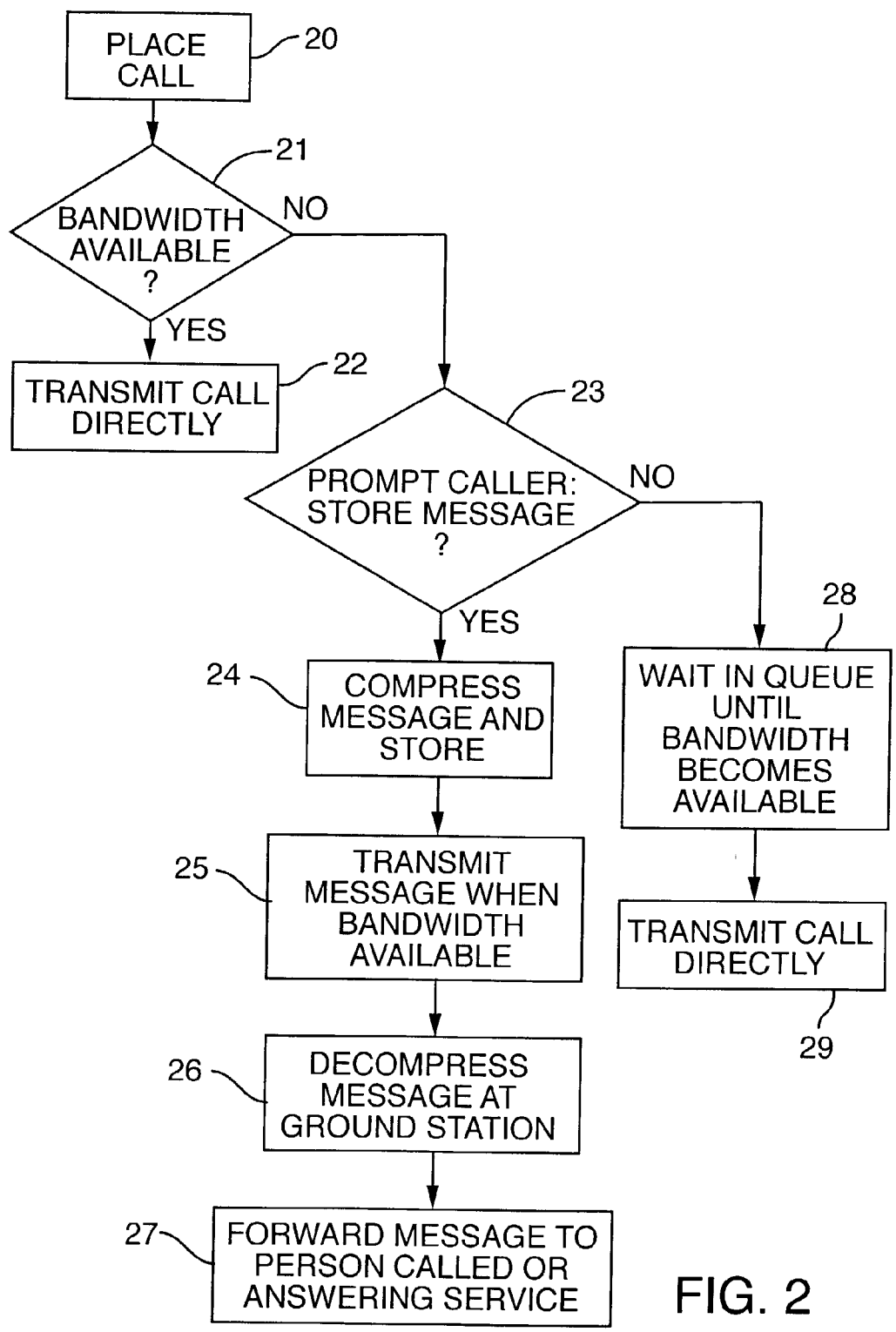
FIG. 2 is a flow chart showing the basic steps used by the system of FIG. 1 for storing messages on an aircraft and for transmitting messages to a ground station.

FIG. 2 is a flow chart showing an exemplary method for storing and transmitting message calls from an aircraft according to the present invention. At step 20, an airborne caller places a call from aircraft telephone 1. At step 21, CTU 2 determines whether bandwidth is available for transmitting the call directly. At step 22, if sufficient bandwidth is available, the call is transmitted to the ground station directly. If sufficient bandwidth is not available, at step 23 the caller is queried whether the call should be sent as a message. If the caller desires to send a message, then the caller is switched to processor 4 for recording and storing a short message at step 24. When processor 4 determines that bandwidth is available, the stored message is transmitted to a ground station at step 25. Upon receipt at the ground station, the message is decompressed at step 26. At step 27, the message is sent to the dialed number, which may be the intended recipient or an answering service. In an additional step, not shown in FIG. 2, a delivery receipt is sent to the originator of the message.

If the caller opted not to store a message at step 23, then the caller can wait in a queue at step 28 until sufficient bandwidth becomes available for placing the call directly to the dialed number at step 29.

What is claimed is:

1. A method for transmitting a call, comprising:
   receiving a call at a controller located on an aircraft from an originator at a local terminal located on the aircraft, the call being directed to a ground station;
   determining whether sufficient communication bandwidth is available for transmitting the call to the ground station;
   storing a recorded message associated with the call in a memory device located on the aircraft;
   combining the recorded message with at least one other stored message into a message file in the memory device located on the aircraft; and
   transmitting the message file to the ground station when sufficient bandwidth becomes available for transmitting the message file.

2. The method of claim 1, further comprising the step of sending a delivery receipt to the controller when the message is delivered to the ground station.

3. The method of claim 1, further comprising:
   dividing the message file into a plurality of packets; and
   transmitting the message file in packet form.

4. The method of claim 1, wherein the message is one of a voice message, a data message, a fax message and an e-mail message.

5. The method of claim 4, wherein the message is delivered to one of an intended recipient of the message and an answering service.

6. The method of claim 1, wherein the recorded message and the at least one other stored message are e-mail messages.

7. The method of claim 1, wherein the recorded message and the at least one other stored message are short data messages.

8. The method of claim 1, further comprising multiplexing the message file with other aircraft data service applications.

9. The method of claim 1, further comprising parsing the message file into the multiple messages and delivering the multiple messages to respective message destinations.

10. The method of claim 1, further comprising providing delivery status information about at least one of the multiple messages to an originator on the aircraft of the at least one of the multiple messages.

11. The method of claim 1, further comprising compressing the message and encrypting the message before transmitting the message to the ground station.

12. A communications system, comprising:
   a plurality of local terminal units located on an aircraft;
   a transmitter configured to communicate with a ground station;
   a control unit located on the aircraft and coupled to the local terminal units, the control unit receiving a call from an originator at one of the plurality of local terminal units and determining whether communication bandwidth is available for transmitting the call;
   a memory device, located on the aircraft and coupled to the control unit, configured to store a message associated with the call when transmitter communication bandwidth is unavailable; and
   the control unit combining the message with at least one other stored message into a message file and the control unit cooperating with the transmitter to transmit the message file to the ground station.

13. The system of claim 12, wherein the control unit sends a delivery receipt to the local terminal when the message is received by the ground station.

14. The system of claim 12, wherein the stored message is one of a voice message, a data message, a fax message and an e-mail message.

15. The system of claim 12, wherein the stored message is an e-mail message.

16. The system of claim 12, wherein the control unit is configured to multiplex the message file with other aircraft data service applications.

17. The system of claim 12, further comprising a ground-based server communicating with the transmitter to receive the message file, parse the message file into multiple messages, and deliver the multiple messages to respective message destinations.

18. The system of claim 17, wherein the ground-based server provides delivery status information about at least one of the multiple messages to an originator on the aircraft of the at least one of the multiple messages.

19. The system of claim 12, wherein the control unit is configured to compress the message and encrypt the message before transmitting the message to the ground station.

20. A method for transmitting a call, the method comprising:
   receiving a message at a controller located on an aircraft from an originator at a local terminal located on the aircraft, the message being directed to a ground station;
   storing the received message in a memory device located on the aircraft;
   combining the received message with at least one stored message into a combined message in the memory device located on the aircraft; and
   transmitting the combined message to the ground station.

21. The method of claim 20, wherein the received message is an e-mail message.

22. The method of claim 21, wherein the at least one stored message is an e-mail message.

23. The method of claim 20, wherein the received message is a short data message.

24. The method of claim 23, wherein the at least one stored message is a short data message.

25. A communication system, comprising:
   at least one local terminal unit located on an aircraft;
   a memory device, located on the aircraft;
   a control unit located on the aircraft and coupled to the at least one local terminal unit and the memory device, the control unit configured to receive a call from a call originator and combine a message associated with the call with a previously stored message; and
   a transmitter configured to transmit the combined message to a ground station.

26. The communication system of claim 25, wherein the call received from the call originator is an e-mail message.

27. The communication system of claim 25, wherein the call received from the call originator is a short data message.

28. The communication system of claim 25, wherein the control unit is configured to determine if communication bandwidth is available for communication with the ground station.

29. A method of transmitting a message from an aircraft to a ground station, comprising:
   accepting a call from a passenger;
   combining the call with at least one previously accepted call in a memory located on the aircraft to produce a combined call; and
   transmitting the combined call to the ground station.

30. The method of claim 29, further comprising determining if communication bandwidth is available for communication with the ground station.

31. The method of claim 30, wherein the accepted call is one of an e-mail message and a short data message, and the previously accepted call is one of an e-mail message and a short data message.

32. A method for transmitting a call, comprising:
   receiving a call at a controller located on an aircraft from an originator at a local terminal located on the aircraft, the call being directed to a recipient not on the aircraft;
   storing the received call in a memory device located on the aircraft; and
   transmitting the stored call with at least one other previously stored call during a single communication session to a ground station.

33. The method of claim 32, further comprising the step of sending a delivery receipt to the local terminal when the stored received call is delivered to the ground station.

34. The method of claim 32, wherein the call is at least one selected from the group of a voice message, a data message, a fax message, and an e-mail message.

35. The method of claim 32, wherein the call and the at least one other stored call are short data messages.

36. The method of claim 32, further comprising compressing the call before transmitting to the ground station.

37. The method of claim 32, further comprising encrypting the call before transmitting to the ground station.

38. The method of claim 32, further comprising determining whether communication capability is currently available for transmitting the call to the ground station.

39. The method of claim 32, further comprising forwarding each call to its intended destination via a ground-based server.

* * * * *